United States Patent Office 3,291,756
Patented Dec. 13, 1966

3,291,756
CATALYTIC DEHYDROGENATION
Robert S. Bowman, Pittsburgh, Pa., assignor to The Baugh Chemical Company, Baltimore, Md., a corporation of Maryland
No Drawing. Filed Jan. 9, 1964, Ser. No. 336,649
5 Claims. (Cl. 252—474)

This invention relates to the catalyzed vapor phase dehydrogenation of organic compounds.

It is among the objects of the invention to provide a catalyst that exhibits high activity in the dehydrogenation of organic compounds, is easily prepared from readily available materials, and is particularly adapted to the dehydrogenation of alkyl benzenes having from 2 to 4, inclusive, carbons in the side chain.

A further object is to provide such a catalyst which when used for dehydrogenation at an elevated temperature in the presence of steam is self-regenerating.

Another object is to provide methods for the production of catalysts in accordance with the foregoing objects whereby to provide catalyst bodies of uniform composition and also catalyst bodies comprising a catalytic surface coating upon an inexpensive, porous substrate and thereby to afford economy of the more expensive catalyst of the coating.

Still another object is to provide a method of dehydrogenating organic compounds with catalysts of this invention at elevated temperatures in the presence of steam that accomplishes the desired dehydrogenation at high efficiency coupled with desirable space yield.

Further objects will appear from the following specification.

The invention is predicated upon my discovery that in the catalyzed vapor phase dehydrogenation of organic compounds catalysts containing substantial amounts of cobaltous ferrite, or a surface layer of this material carried by a suitable substrate, exhibit unusually high dehydrogenation activity in the presence of steam, and that cobaltous ferrite ($CoO \cdot Fe_2O_3$) is useful for dehydrogenating ethylbenzene to styrene, and also for producing butadiene from the n-butenes.

The classical procedure for preparing the ferrites of a variety of metals involves the high temperature calcination of an intimate mixture of ferric oxide and the particular metal oxide or carbonate. I have discovered also, and it is upon this that the invention is predicated in part, that whereas an intimate mixture of ferric oxide and cobaltous carbonate undergoes only a 25 to 50 percent conversion to cobaltous ferrite during two hours of calcining at 1750° F. in a steam atmosphere, complete conversion to cobaltous ferrite under the same conditions is achieved if the mixture contains a small amount, say 0.65 weight percent, of potassium carbonate.

The presence of cobaltous ferrite made in this way from equimolar amounts of cobaltous carbonate ($CoCO_3$) and ferric oxide ($Fe_2O_3$) was established by X-ray diffraction analyses in which the appearance of cobaltous ferrite and the disappearance of ferric oxide are measured.

Cobaltous ferrite as made thus is a black, magnetic material which has a cubic spinel structure. By using greater amounts of potassium carbonate, such as 10 to 20 percent, substantially complete conversion of the ferric oxide to cobaltous ferrite can be obtained by steam calcination at 1650° F. for one-half hour, or at lower temperatures, such as 1500° F., for longer periods of time. A calcination temperature range of 1400–1850° F. suffices for the production of bulk phase catalysts of the invention, depending, as indicated, upon the amount of $K_2CO_3$ present; calcination at about 1650° F. is preferred for most purposes.

Cobaltous ferrite-containing catalysts suited to the objects of the invention may be made, according to the following procedures which form a part of the invention.

*Procedure A (Double Stage).*—A mixture of 174.8 g. ferric oxide, 135.2 g. cobaltous carbonate and 6.0 g. of potassium carbonate is thoroughly mixed in a water slurry. The entire mass is air dried in a stream of heated air (100–150° F.), after which it is steam calcined at 1750° F. for 2 hours. The black, magnetic product is then slurried in 800 ml. water containing 6.9 g. of suspended chromic oxide and 30.0 g. of dissolved potassium carbonate. The entire mass is air dried as above, then pulverized suitably to pass a 20 mesh Tyler sieve, and pelletized to form 3/16″ pills which are then steam calrined for one hour at a moderate temperature, 800–1200° F., to yield the finished catalyst.

*Procedure B (Single Stage).*—Harder, more serviceable catalyst pills can be obtained by using a single stage procedure in which all of the total ingredients in the above example are mixed together in a water slurry. The entire mass is dried, then pulverized and pelletized as in Procedure A. The pills are then steam calcined for two hours at 1600° F. to yield the finished catalyst.

The above two examples yield a product composed of, by weight 89.1% cobaltous ferrite, 8.6% $K_2O$, and 2.3% chromic oxide ($Cr_2O_3$).

*Procedure C.*—Water soluble iron and cobalt salts, such as ferrous or ferric acetate and cobaltous acetate can be used instead of iron oxide and cobaltous carbonate. Further, metallic iron powder can be employed as the starting material by dissolving it in hot aqueous acid, suitably acetic acid. Thus, for example, 136 g. of finely divided iron powder is dissolved in an aqueous acetic acid containing 437 g. glacial acetic acid and 350 g. water by heating and stirring for one and one half hours at 80 to 90° C. Then 40 g. of additional glacial acetic acid, 500 g. of water, and 107 g. of cobaltous carbonate are added to the stirred mixture. The mixture is stirred at 80 to 90° C. until all of the cobaltous carbonate has dissolved. The aqueous acetic acid solution of ferrous acetate and cobaltous acetate is then air dried at 110° C., and heated on a hot plate in air. This treatment volatilizes the excess acetic acid and also causes combustion of the acetate ions, producing a glowing mass. The resulting black product is pulverized and slurried in 500 ml. water containing 6.9 g. suspended chromic oxide and 49.0 g. dissolved potassium carbonate. The entire mass is air dried, which may be accomplished by a drum drier in a commercial practice, then crushed to pass a 20 mesh screen (Tyler), and then pelletized to form 3/16″ pills which are then steam calcined one hour at 1650° F. to yield very hard, black magnetic pills which, upon X-ray analysis, are found to contain cobaltous ferrite as the major phase, with a minor amount of $K_2CO_3$ and a small amount of the hexagonal $K_2O \cdot 11Fe_2O_3$. The finished catalyst is designed to be composed of, by weight, 67.7% $CoO \cdot Fe_2O_3$, 18.9% $Fe_2O_3$, 11.1% $K_2O$, and 2.3% $Cr_2O_3$.

*Procedure D.*—An economy in the use of cobaltous salts can be effected by using a surface coating preparative technique, as follows. A water slurry containing by weight, 247.2 g. ferric oxide, 6.9 g. chromic oxide, and 49.0 g. of dissolved potassium carbonate in 500 ml. water is well mixed, then air dried. The product is pulverized, then pelletized and steam calcined, in this case 1 hour at 1600° F. The resulting pills (non-magnetic) are then sprayed to saturation with an aqueous, saturated cobaltous acetate solution, using an atomizer. The wetted pills are dried at 110° C., then air calcined one hour at 1100°

F. to yield the finished catalyst. The product is now magnetic and dark in color, indicative of the formation of surface cobaltous ferrite. From the amount of absorbed cobaltous acetate, the catalyst composition can be taken as, by weight, 5.0% surface $CoO.Fe_2O_3$, 81.6% $Fe_2O_3$, 11.1% $K_2O$, and 2.3% $Cr_2O_3$. Calcination may be effected at temperatures above 1100° F. but in this procedure the surface location of the reactants makes possible the use of lower calcination temperatures than are used for procedures A to C.

Higher or lower surface concentrations of cobaltous ferrite can be obtained by the above technique D. More dilute, or less volume, of the cobaltous acetate solution can be employed. For the deposition of a greater amount of cobaltous ferrite, a second spraying with aqueous cobaltous acetate can be employed after the pills have been thoroughly dried. Other water soluble or dispersable, heat decomposable, cobaltous salts, with the exception of cobaltous halides, can be used in this application. A practical spraying solution can be prepared by dissolving cobaltous carbonates in aqueous acetic acid.

From the above information it can be recognized that a wide compositional range is possible by employing the variety of techinques found to be applicable to the preparation of cobaltous ferrite-containing catalysts.

The use of potassium carbonate plays a dual role in that (a) there is provided its effect of vastly increasing the rate of cobaltous ferrite formation and (b) it functions as a promoting agent in the catalyst. A promoting agent in this instance is defined as a material which confers selectively, constant activity, and water-gas activity to the catalyst. Thus, the catalyst is self-regenerative and can be run continuously under dehydrogenation conditions in the presence of steam for long periods of time. Other potassium compounds decomposable by heat to yield $K_2O$ may be used instead of $K_2CO_3$, e.g., $KNO_3$ or $KOH$. All of these may be said to be alkaline potassium compounds.

The high activity of cobaltous ferrite catalysts of this invention may be exemplified with reference to ethylbenzene dehydrogenation by inspection of the data contained in the following table. These data were obtained by passing a preheated mixture of steam and commercial ethylbenzene vapor, at a 10 to one mole ratio, through a 100 cc. bed, 11 cm. high, of 3/16" catalyst pills contained within a heated furnace, and the bed was so located that the unit was partially adiabatic in character in order to simulate more closely the standard practice in the United States for the commercial dehydrogenation of ethylbenzene. The temperature of the vapors entering the catalyst bed was maintained at 600° C., while the emerging vapors were at 530 to 561° C., depending on the activity of the catalyst. Vapor velocity was adjusted to afford an average contact time of 0.90 to 0.92 second, assuming that the 100 cc. of reactor space occupied by the catalyst bed is void space. The effluent vapors were condensed, using a cold water condenser, and the organic, insoluble fraction was weighed periodically and then analyzed by gas chromatography for benzene, toluene, ethylbenzene and styrene. The non-condensed gas was measured by volume, and analyzed for carbon dioxide content. The mole percent conversion of ethylbenzene (EB) was calculated by noting the amount of unreacted ethylbenzene recovered. Thus, moles EB consumed × 100/moles EB fed to reactor equals mole percent conversion. The mole percent catalyst efficiency was calculated by dividing the moles of styrene obtained (×100) by the moles of EB consumed. The styrene space yield, in terms of pounds of styrene produced per cubic foot of catalyst per hour, is included to provide a comparison of catalyst work capacity. The data have been averaged over three-to five-day periods on stream.

In the table catalyst 2 is a commercially available catalyst for converting EB to styrene; catalyst 1 is of the same composition but made by the foregoing Procedure B (without $CoCO_3$).

| Catalyst | Wt. Percent Composition | Mole Percent Conversion of Ethylbenzene | Mole Percent Catalyst Efficiency | Styrene Space Yield | Method of Cat. Prep. |
|---|---|---|---|---|---|
| 1 | 86.6% $Fe_2O_3$<br>11.1% $K_2O$<br>2.3% $Cr_2O_3$ | 49.6 | 91.0 | 16.9 | B |
| 2 | 86.5% $Fe_2O_3$<br>11.2% $K_2O$<br>2.3% $Cr_2O_3$ | 50.5 | 91.1 | 16.9 | (1) |
| 3 | 89.1% $CoO.Fe_2O_3$<br>8.6% $K_2O$<br>2.3% $Cr_2O_3$ | 59.2 | 89.1 | 20.3 | A |
| 4 | 89.1% $CoO.Fe_2O_3$<br>8.6% $K_2O$<br>2.3% $Cr_2O_3$ | 53.3 | 91.4 | 17.6 | B |
| 5 | 67.7% $CoO.Fe_2O_3$<br>18.9% $Fe_2O_3$<br>11.1% $K_2O$<br>2.3% $Cr_2O_3$ | 59.6 | 89.2 | 19.6 | C |
| 6 | 67.7% $CoO.Fe_2O_3$<br>18.9% $Fe_2O_3$<br>11.1% $K_2O$<br>2.3% $Cr_2O_3$ | 53.6 | 90.4 | 17.7 | B |
| 7 | 20.0% $CoO.Fe_2O_3$<br>56.6% $Fe_2O_3$<br>11.1% $K_2O$<br>2.3% $Cr_2O_3$ | 50.4 | 91.0 | 16.8 | B |
| 8 | 10.0% $CoO.Fe_2O_3$<br>85.9% $Fe_2O_3$<br>11.8% $K_2O$<br>2.3% $Cr_2O_3$ | 49.6 | 91.6 | 16.7 | B |
| 9 | 8.4% $CoO.Fe_2O_3$<br>78.2% $Fe_2O_3$<br>11.1% $K_2O$<br>2.3% $Cr_2O_3$ | 54.5 | 89.5 | 18.0 | D |
| 10 | 5.0% $CoO.Fe_2O_3$<br>81.6% $Fe_2O_3$<br>11.1% $K_2O$<br>2.3% $Cr_2O_3$ | 53.5 | 91.3 | 18.2 | D |

[1] Commercial catalyst.

Referring to the table it is evident that the replacement of all, or a substantial portion of, the iron oxide of catalysts 1 and 2 by cobaltous ferrite effects a notable increase in catalyst activity. Further, these increases in activity can be obtained without objectionable losses in catalyst efficiency. Therefore, the important increases in styrene space yields are made possible without increasing the reactor temperature. At lower cobaltous ferrite levels, as in catalysts 7 and 8, the bulk phase dilution effect decreases the activity to that of the conventional iron oxide catalysts 1 and 2. However, by placing the cobaltous ferrite only on the surface of the catalyst, as in catalysts 9 and 10, important improvements in conversion and styrene space yields are obtained.

Chromic oxide is desirable, although not essential, for it acts as a stabilizer to prevent or retard the reduction of $Fe_2O_3$ beyond $Fe_3O_4$ by the $H_2$ formed during dehydrogenation; excessive reduction would impair the performance of the catalyst.

A variety of iron oxides can be employed in the successful preparation of these cobaltous ferrite catalysts. Thus, ferrous oxide (FeO) and magnetite ($Fe_3O_4$) can be employed as well as hematite, for under the conditions of catalyst preparation they are converted to hematite which then reacts with the cobaltous carbonate to form cobaltous ferrite and carbon dioxide. Catalyst number 6, for example, was prepared from magnetite, using Procedure B.

In actual practice, the iron oxide in catalysts 1 and 2 is converted largely to magnetite under the reaction conditions of converting ethylbenzene to styrene and hydrogen in the presence of high temperature steam.

The cobaltous ferrite in the catalysts of this invention is not affected by the mild reduction environment of the reactor. The recovered catalysts, after cooling in nitrogen, are found to contain unaltered cobaltous ferrite. Further, a long exposure to an oxidative environment, such as heating in an air muffle furnace at 560° C. for 17 weeks, did not alter the catalyst. Thus, a catalyst containing 54.0% $CoO.Fe_2O_3$, 32.3% $Fe_2O_3$, 11.4% $K_2O$, and 2.3% $Cr_2O_3$ prepared in pilot stage equipment by Procedure B process, was found after exposure to those conditions, to effect 51.9 percent conversion of ethylbenzene, at an efficiency of 89.5 percent, and an average styrene space yield of 17.0.

In the preparation of catalysts in accordance with the invention a critical and essential factor is the use of a cobaltous compound. An attempt to prepare cobaltous ferrite by using cobalt oxide ($Co_3O_4$), a commercially available oxide of cobalt, instead of cobaltous carbonate gave only a small yield of the desired cobaltous ferrite after steam calcining at 1750° F. The resulting potassium promoted catalyst was found to be "wild" in that excessive gas evolution, containing much $CO_2$ (23%), and excessive benzene formation (6.5–11.3%) occurred. The styrene content in the liquid organic product decreased from 11.3 percent after one-half hour, to 3.8 percent after a total of three hours on stream. Normal behavior of the catalysts described above involves the production of 40 to 45 percent styrene and only 1.2 to 2.0 percent benzene in the liquid organic product, and a $CO_2$ content of but 5 to 7 percent in the non-condensable effluent gas. The cobaltic ion is known to be a powerful oxidizing agent, and its presence in a dehydrogenation catalyst where a high degree of selectivity or efficiency is desired must be avoided. The cobaltous ion, on the other hand, when presented to the system in a stabilized form, i.e. as the potassium promoted cobaltous ferrite, exhibits a controlled, selective dehydrogenation activity.

Cobaltous ferrite-containing catalysts made as described above have also been employed in the dehydrogenation of the n-butenes to butadiene. For example, catalyst number 3, from the table affords a 23.4 mole percent conversion of butene-1 and -2 at an efficiency level of 70.1 percent, using a reactor system similar to that described in the ethylbenzene dehydrogenation work. These catalysts may be used also for the dehydrogenation of alkylbenzenes the side chains of which contain 2 to 4, inclusive, carbon atoms, e.g. isopropylbenzene and the butylbenzenes.

For most purposes dehydrogenation using these catalysts proceeds satisfactorily at about 500° to 700° C.

For the purpose of the invention the catalysts may be defined as being essentially, by weight:

Cobaltous ferrite 2 to 90 percent.
Free iron oxide 0 to 85 percent.
Potassium, calculated as $K_2O$, 5 to 20 percent.
Chromic oxide ($Cr_2O_3$) 0 to 5 percent.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically described.

I claim:
1. A dehydrogenation catalyst consisting essentially of, by weight, about 2 to 90 percent of cobaltous ferrite, from about 5 to 20 percent of potassium calculated as $K_2O$, from 0 to 85 percent of free ferric oxide, and from 0 to 5 percent of chromic oxide.

2. A dehydrogenation catalyst consisting essentially of, by weight, about 67.7 percent of cobaltous ferrite, about 11.1 percent of potassium calculated as $K_2O$, about 18.9 percent of free ferric oxide, and about 2.3 percent of chromic oxide.

3. That method of making cobaltous ferrite catalyst comprising the steps of forming a mixture of an iron oxide and a cobaltous salt other than a halide, and an alkaline potassium compound decomposable by heat in an amount equivalent to about 5 to 20 percent by weight of $K_2O$, and from about 0 to 5 percent by weight of chromic oxide, and heating the mixture in steam at about 1400° to 1850° F.

4. That method of making cobaltous ferrite catalyst comprising the steps of forming a mixture of substantially equimolar amounts of ferric oxide and a cobaltous salt other than a halide, and a potassium compound decomposable by head in an amount equivalent to about 5 to 20 percent by weight of $K_2O$, and from about 0 to 5 percent by weight of chromic oxide, and heating the mixture in steam at about 1650° F.

5. That method of making cobaltous ferrite catalyst comprising the steps of forming into pellets a mixture of ferric oxide, chromic oxide, and an alkaline potassium compound decomposable by heat, calcining the mixture at about 1600° F., then applying to the surface of the thus-calcined pellets a solution of a cobaltous salt other than a halide, and then calcining at about 1100° F. in air.

References Cited by the Examiner

UNITED STATES PATENTS 3,179,707   4/1965   Lee _____ 260—669

DELBERT E. GANTZ, *Primary Examiner.*

C. R. DAVIS, *Assistant Examiner.*